US010592259B2

(12) United States Patent
Chen et al.

(10) Patent No.: US 10,592,259 B2
(45) Date of Patent: Mar. 17, 2020

(54) MANAGED APPLICATION DETECTION LOGIC

(71) Applicant: AirWatch LLC, Atlanta, GA (US)

(72) Inventors: Lucas Chen, Atlanta, GA (US); Raghuram Rajan, Atlanta, GA (US); Jonathan Blake Brannon, Mableton, GA (US)

(73) Assignee: AIRWATCH LLC, Atlanta, GA (US)

( * ) Notice: Subject to any disclaimer, the term of this patent is extended or adjusted under 35 U.S.C. 154(b) by 73 days.

(21) Appl. No.: 15/627,543

(22) Filed: Jun. 20, 2017

(65) Prior Publication Data

US 2017/0286129 A1 Oct. 5, 2017

Related U.S. Application Data

(63) Continuation of application No. 14/731,772, filed on Jun. 5, 2015, now Pat. No. 9,703,572.

(51) Int. Cl.
*G06F 9/48* (2006.01)
*G06F 9/445* (2018.01)
*G06F 9/448* (2018.01)

(52) U.S. Cl.
CPC .............. *G06F 9/448* (2018.02); *G06F 9/445* (2013.01); *G06F 9/44536* (2013.01)

(58) Field of Classification Search
CPC ....... G06F 9/448; G06F 9/445; G06F 9/44536
See application file for complete search history.

(56) References Cited

U.S. PATENT DOCUMENTS

| | | | |
|---|---|---|---|
| 8,813,179 B1* | 8/2014 | Qureshi | H04L 63/20 726/1 |
| 2014/0298420 A1* | 10/2014 | Barton | H04L 63/10 726/4 |
| 2015/0007350 A1* | 1/2015 | Gudipati | G06F 21/54 726/30 |

\* cited by examiner

*Primary Examiner* — Emerson C Puente
*Assistant Examiner* — Jonathan R Labud
(74) *Attorney, Agent, or Firm* — Thomas | Horstemeyer, LLP

(57) ABSTRACT

Various examples for application management detection are described. In one example, depending upon whether an installation token includes a unique token value, a client device can determine whether an application is managed or unmanaged. Additionally, the client device can determine whether the application is managed or unmanaged based on whether a keychain installation token includes a unique token value, a value of a keychain installation token, and a value of a launched flag for the application. Using the concepts described herein, an unmanaged application can proceed to execute with limited functionality, present a notification that it should be reinstalled by the management service, stop executing, or take other measures.

20 Claims, 5 Drawing Sheets

30

| Scenario | Installation Token 173 | Keychain Installation Token 175 | Launched Flag 177 | Managed Status |
|---|---|---|---|---|
| 1 | None | N/A | N/A | Unmanaged |
| 2 | Token A | None | Not Launched | Managed |
| 3 | Token A | Token A | Not Launched | Unmanaged |
| 4 | Token A | Token A | Launched | Managed |
| 5 | Token B | Token A | Not Launched | Managed |
| 6 | Any | None | Launched | Unmanaged |

*FIG. 3*

MANAGED APPLICATION DETECTION LOGIC

CROSS-REFERENCE TO RELATED APPLICATION

This application is a continuation of, claims the benefit of, and priority to U.S. patent application Ser. No. 14/731,772 entitled "MANAGED APPLICATION DETECTION LOGIC," filed on Jun. 5, 2015, now issued as U.S. Pat. No. 9,703,572, the contents of which are incorporated by reference in its entirety herein.

BACKGROUND

Computing devices are used by individuals for personal, work-related, and other purposes. These computing devices are offered in various platforms, including desktop computers, laptop computers, personal digital assistants, wearable computing devices, cellular telephones, music or media players, or tablet computers, among other types. Some computing devices, particularly those used for work-related purposes, can be subject to one or more management policies. In that context, a company might wish to retain control over one or more aspects of the operation of devices that are used by the company's users. For example, the company might have a policy that restricts the use of company-issued computing devices for personal matters. To enforce such a policy, the company might wish to restrict the types of applications that can be installed on their devices. As another example, the company might have a policy that restricts user access to certain content or data files using third party applications.

As one way to administer and manage devices, a company may rely upon enterprise mobility management (EMM). EMM can encompass the managed distribution of applications to mobile devices, the configuration and distribution of settings for mobile devices, and the oversight of operating conditions for mobile devices. EMM can be administered across an entire enterprise of mobile or other types of computing devices by a centralized management platform. By controlling and protecting data, configuration, application, and other settings for mobile devices using a centralized EMM platform, EMM can reduce risk and exposure for a company while saving information technology costs and downtime. To some extent, EMM relies upon a network connection with mobile devices to identify and update certain operating parameters and conditions of the devices over time. In some cases, however, network connections are unavailable or fail.

Moreover, an enterprise may provide various apps that perform tasks. A managed version of the application can be provided for managed devices, and an unmanaged version of the same application can also be available. An issue can arise when a user is supposed to install and use the managed version of an application, but instead installs the unmanaged version or both an unmanaged version and the managed version. In this situation, the enterprise managing a device might not be able to detect that the device includes an unmanaged version of the application due to not being able to detect whether a particular version of an application is managed or unmanaged. For example, a device might have to communicate with a management server to determine whether a particular application is managed or unmanaged, but the network connection might be unavailable. As a result, the enterprise might not be able to perform administrative functions, such as removing the unmanaged application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 illustrates a table that outlines conditions for determining a managed or unmanaged status of an application according to various examples described herein.

DETAILED DESCRIPTION

As noted above, EMM relies in part upon a network connection with mobile devices to identify and update certain operating parameters and conditions of the devices over time. In some cases, however, network connections are unavailable or fail. Moreover, relying on a communication to and from a server can lead to processing delays. In that context, the concepts described herein include the local detection of managed applications on client devices. For example, one or more applications executing on a client device may incorporate logic that determines whether or not they were installed by a management service, such as an EMM service.

In that context, it is noted that a user of a device can install applications without those applications being installed and managed by an EMM service. For example, the user can install the applications directly from some unknown network server or host, directly from a memory device, from a public application repository, or in other ways without the installation being directed or managed by the EMM service. To help address these types of security concerns, the concepts described herein incorporate the local detection of the management status of applications. According to the concepts of application management detection described herein, if a client application determines that it was not installed at the direction of an EMM or similar service, the client application can proceed to execute as an unmanaged application with limited functionality, present a notification on a user interface that it should be reinstalled by the EMM service, stop executing, or take other measures.

Figure 1:
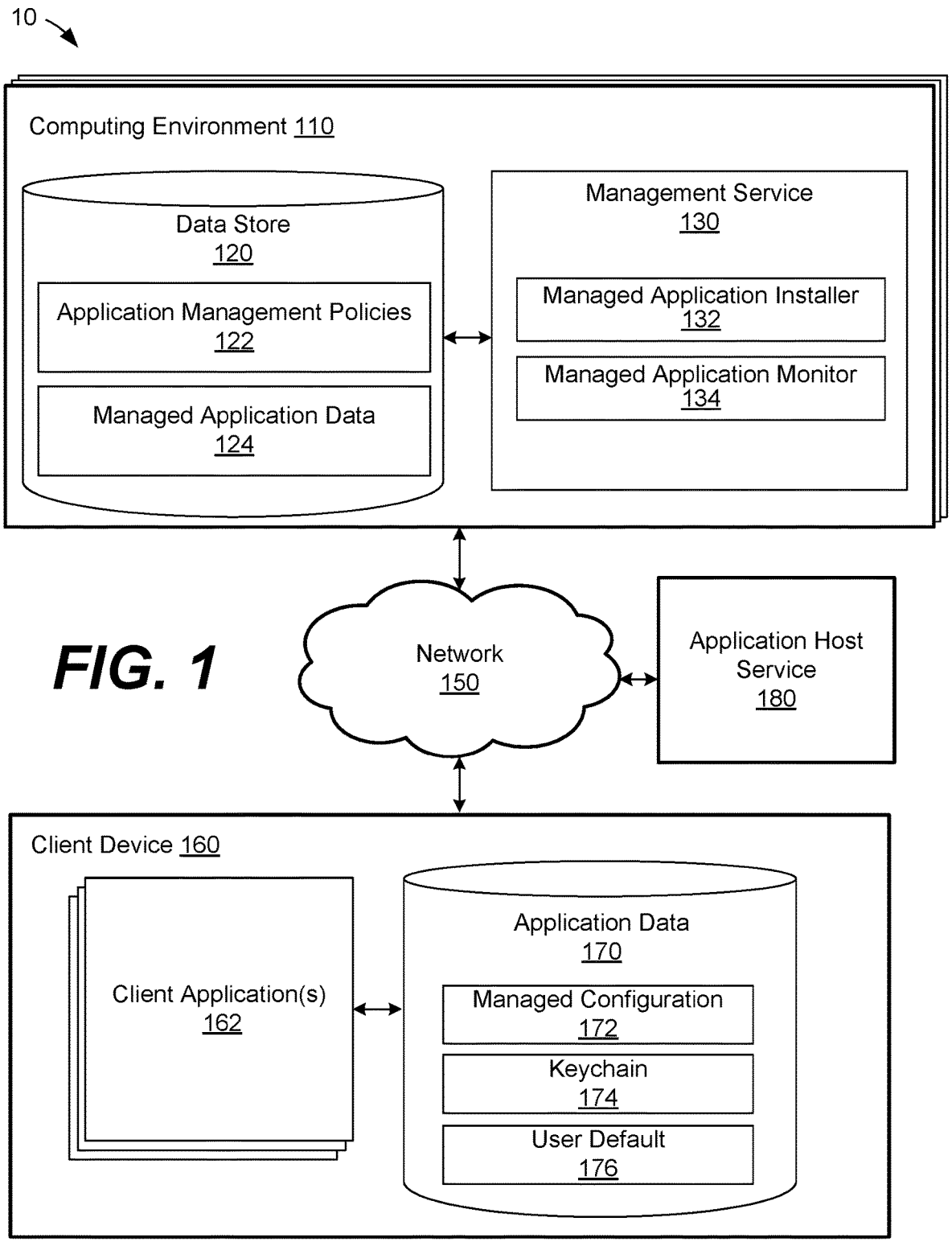
FIG. 1 illustrates an example diagram of a networked computing environment that uses managed application detection logic according to various examples described herein.

FIG. 1 illustrates an example diagram of a networked computing environment 10 that facilitates managed application detection logic. The networked environment 10 can include a computing environment 110, a network 150, a client device 160, and an application host service 180. The networked computing environment 10 can be representative of an enterprise computing environment of a company or other entity. For example, the computing environment 110 can store and process data, execute services, manage the client device 160, and perform other processing tasks for the company. Further, the client device 160 can be a device issued to an employee of the company. However, the networked computing environment 10 is not limited to any particular type, structure, or purpose of enterprise platform.

The computing environment 110 can be a computer, computing device, or computing system. The computing environment 110 can include one or more computing devices arranged, for example, in one or more server or computer banks. The computing device or devices can be located at a single installation site or distributed among different geographical locations. The computing environment 110 can include a plurality of computing devices that together embody a hosted computing resource, a grid computing resource, or other distributed computing arrangement. In some cases, the computing environment 110 can be an elastic computing resource where an allotted capacity of processing, network, storage, or other computing-related resources varies over time. The computing environment 110 can also include or correspond to one or more virtualized server instances that are created in order to execute the functionality described herein.

The computing environment 110 can also include, in part, various functional (e.g., computer-readable instruction), logic (e.g., device, circuit, or processing circuit), or functional and logic elements that can be executed by the computing environment 110 to direct the computing environment 110 to perform aspects of the examples described herein. For example, the computing environment includes the management service 130, which directs the computing environment to perform functions and processes for device management, similar, at least in part, to EMM.

The network 150 can include the Internet, intranets, extranets, wide area networks (WANs), local area networks (LANs), wired networks, wireless networks, cable networks, satellite networks, other suitable networks, or any combinations thereof. The computing environment 110 can communicate with other devices coupled to the network 150 using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof. The network 150 can include connections to any number and type of network hosts or devices, such as website servers, file servers, cloud computing resources, databases, data stores, or any other network or computing architectures.

The client device 160 is representative of any computing device, processing circuit, or processor based device or system, including those in the form of a desktop computer, a laptop computer, a personal digital assistant, a wearable computing device, a cellular telephone, a set-top box, a music or media player, or a tablet computer, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

Next, a more detailed description of the structure and operation of the computing environment 110, the client device 160, and the application host service 180 is provided. Among other elements, the computing environment 110 includes a data store 120 and a management service 130. Among other types, categories, or partitions of data, the data store 120 can store application management policies 122 and managed application data 124. The management service 130 includes one or more logic elements, engines, or services that perform or embody various aspects of the features described herein, including a managed application installer 132 and a managed application monitor 134.

The application management policies 122 can store management policies and data for the applications installed (and to be installed) on devices, such as the client device 160, among others. Particularly, the application management policies 122 can store policies for the managed applications installed by the mobile management service 130 on the client device 160. For example, the application management policies 122 can define default application settings, application prerequisites, feature restrictions, feature limitations, feature conditions, configuration information, or other managed configuration data for the applications installed on the client device 160.

The managed application data 124 can store information about the managed applications that were installed on the client device 160 by the mobile management service 130. For example, the managed application data 124 can store installation date, installation version, host device operating system, host device operating parameter, unique installation token, and other related information for the managed applications installed on the client device 160. Both the application management policies 122 and the managed application data 124 can be updated over time by the management service 130.

The managed application installer 132 can direct the installation of managed, unmanaged, or both managed and unmanaged applications on the client device 160 over the network 150. The managed application installer 132 can direct the installation (or update) of one or more applications upon request, at predetermined or specific times, at predetermined intervals of time, or based on other conditions or factors. When installing managed applications on the client device 160, the managed application installer 132 can also install managed configuration data for the application on the client device 160. As described in further detail below, the managed configuration data can define default or required permissions, features, settings, functions, and other operating parameters of the application being installed. In that way, the managed application installer 132 can retain control over certain aspects of the operation and execution of applications being installed on the client device 160. Further, when installing an application to the client device 160, the managed application installer 132 can generate a unique token associated with the application and store that unique token in memory on the client device 160. This unique token can be relied upon by the application, after installation on the client device 160, to determine if it is managed by the management service 130 or not. The application can even determine whether or not it is by the management service 130 when network connectivity through the network 150 is lost.

The managed application installer 132 can direct client device 160 to obtain and install an application from the application host service 180. In turn, the client device 160 can install the application from the application host service 180 over the network 150 at the direction of the managed application installer 132. In that sense, the application host service 180 can be a computer, computing device, or computing system that stores and distributes applications for installation to various devices through the network 150. In other cases, the client device 160 can install the application from the computing environment 110 over the network 150.

The managed application monitor 134 can review the status of the client device 160 to determine whether the client device 160 and applications on the client device 160 are compliant with the application management policies 122. The managed application monitor 134 can also determine whether an application stored on the client device 160 is a managed application by inspection of the client device 160 over the network 150. According to the concepts described herein, however, certain applications installed on the client device 160 can independently determine whether or not they are managed by the management service 130 even without network connectivity over the network 150. In addition, an EMM application executing on the client device 160 can monitor applications on the client device 160 to determine whether the applications are managed.

Among other elements, the client device 160 includes a client application 162 and application data 170. Among other data, the application data 170 includes managed configuration data 172, keychain data 174, and user default data 176. As described in further detail below, the client application 162 can reference information stored in the managed configuration data 172, the keychain data 174, and the user default data 176 to determine its status as a managed or unmanaged application.

The client application 162 is representative of one or more applications that can be installed and executed on the client device 160. In that sense, the client application 162 may be stored in memory of the client device 160, loaded into memory for execution, and executed by any processor or combination of processors or processing circuits as described in further detail below. Among other types of applications, the client application 162 can be an application designed to perform certain tasks, access and manipulate data or databases, view content, edit content, or for any other purpose. In that context, the client application 162 can be a document viewer or editor application, image viewer or editor application, or media file viewer or editor application. The client application 162 can also be a hypertext-based communications application, such as Wget or cURL, an e-mail client, an internet browser, such as the INTERNET EXPLORER®, FIREFOX®, CHROME®, SAFARI®, or SILK® browser, another type of browser or tool, or a variant thereof, without limitation. As other examples, the client application 162 can be a messenger client or application, such as Microsoft Lync®, Short Messaging Service (SMS), or Multimedia Messaging Service (MMS).

As described herein, the client application 162 can be installed and managed by the management service 130. Thus, the computing environment 110 can maintain some management control over the permissions, features, settings, functions, and other operating parameters of the client application 162 at the time of installation and after. Managed control of the client application 162 can be defined, for example, through settings defined and stored in the managed configuration data 172 by the management service 130. For example, the managed configuration data 172 can define default or required permissions, features, settings, functions, and other operating parameters of the client application 162. In one case, when an application such as the client application 162 is installed on the client device 160 as a managed application, the management service 130 can define and store settings for the client application 162 in the managed configuration data 172. It should be noted, however, that the settings can be stored and updated at any time. Further, when the client application 162 is installed on the client device 160, the management service 130 can also generate a unique token associated with the installation that is stored in the managed configuration data 172. This unique token can be relied upon, at least in part, by the application to determine if it is managed or not, as described in further detail below, even if network connectivity through the network 150 is lost.

Even if the client application 162 should be installed as a managed application by the management service 130 pursuant to its policies, a user of the client device 160 can install the client application 162 without it being managed. For example, the user can install the client application 162 directly from the application host service 180 without the installation being managed by the management service 130. Additionally, the user can install the client application 162 directly from another host on the network 150, directly from a memory device coupled to the client device 160, or other ways without the installation being directed or managed by the management service 130. To help address this security concern, the client application 162, or another EMM application executing on the client device 160, is designed to determine whether or not it is a managed application. According to the concepts of application management detection described herein, if the client application 162 determines that it was not installed at the direction of the management service 130, is not managed by the management service 130, or both, the client application 162 can be detected as an unmanaged application, and the user can be notified of having installed the incorrect version, the unmanaged application can be stopped, or other remedial actions can be taken. For example, if the client device 160 detects that an unmanaged version of an application has been installed when a managed version should have been installed, the EMM software executing on the client device 160 can lock a user out of corporate network access, enforce restrictions on accessing corporate e-mail, managed internet browsers, or corporate files, and perform other remedial actions on the device until the unmanaged version of the application has been removed.

In the client device 160, the managed configuration data 172, keychain data 174, and user default data 176 are associated, at least in part, with the client application 162. Examples of the types of data stored in the managed configuration data 172, keychain data 174, and user default data 176 are provided below. The managed configuration data 172, keychain data 174, and user default data 176 can be accessed by the client application 162 using an application program interface (API) call. However, the client application 162 can determine its management status regardless of the manner in which data is accessed.

The managed configuration data 172 can store data values, data structures, or both data values and data structures that define the permissions, features, settings, functions, and other operating parameters of the client application 162. According to the operation of the underlying system software of the client device 160, the managed configuration data 172 can be stored by the management service 130. Particularly, the management service 130 can access, write, and read data to and from the managed configuration data 172. On the other hand, the client application 162 can access and read the managed configuration data 172, but, in one example, may not be capable of storing or modifying it. Further, if the client application 162 is deleted or uninstalled from the client device 160, the managed configuration data 172 is not deleted or wiped by the underlying system software of the client device 160. In one example, there can be a set of managed configuration data 172 for each managed or unmanaged application installed on a device. The managed configuration data 172 can include a token for the application, and the token can change, in one example, every time the application is installed or updated. As a result, the token stored in managed configuration data 172 can be uniquely associated with the particular installation of the application on the client device 160. Upon removal of the client application 162, the managed configuration data 172 can persist in memory even if the client application 162 is deleted or uninstalled from the client device 160.

The keychain data 174 stores data associated with the client application 162 and other applications on the client device 160, such as user login and password information, for example, among other data. The keychain data 174 may be encrypted, at least in part, to protect its contents, but it is not necessary that the keychain data 174 be encrypted in its entirety. Because of its secure, encrypted nature, the client application 162 can store sensitive data and other related information in the keychain data 174. Similar to the managed configuration data 172, because the keychain data 174 can store data associated with applications on the client device 160 other than the client application 162, the keychain data 174 persists even if the client application 162 is deleted or uninstalled from the client device 160. In one example, applications that share a common certificate, such as when multiple applications have been created by a developer, can access the shared keychain for that developer's applications.

The user default data 176 can store data that allows the client application 162 to customize its behavior, available functions, available features, and other options. For example, the user default data 176 can store data that defines defaults, such as units of measure, default display parameters, default save or print parameters, and other options of the client application 162. In contrast to the managed configuration data 172 and the keychain data 174, the user default data 176 can be deleted or removed if the associated client application 162 is deleted or uninstalled from the client device 160. It is also noted that, if the client application 162 and the application data 170 of the client device 160 are backed up using a data backup service, the managed configuration data 172 and the user default data 176 can be backed up, but the client device 160 does not permit backups of the keychain data 174. Thus, if the client device 160 is restored using a backup service over the network 150 or an application facilitating restoration of data stored on the client device 160, the client application 162, the managed configuration data 172, and the user default data 176 can be restored, but the keychain installation token 175 might not be restored, in one embodiment.

Figure 2:
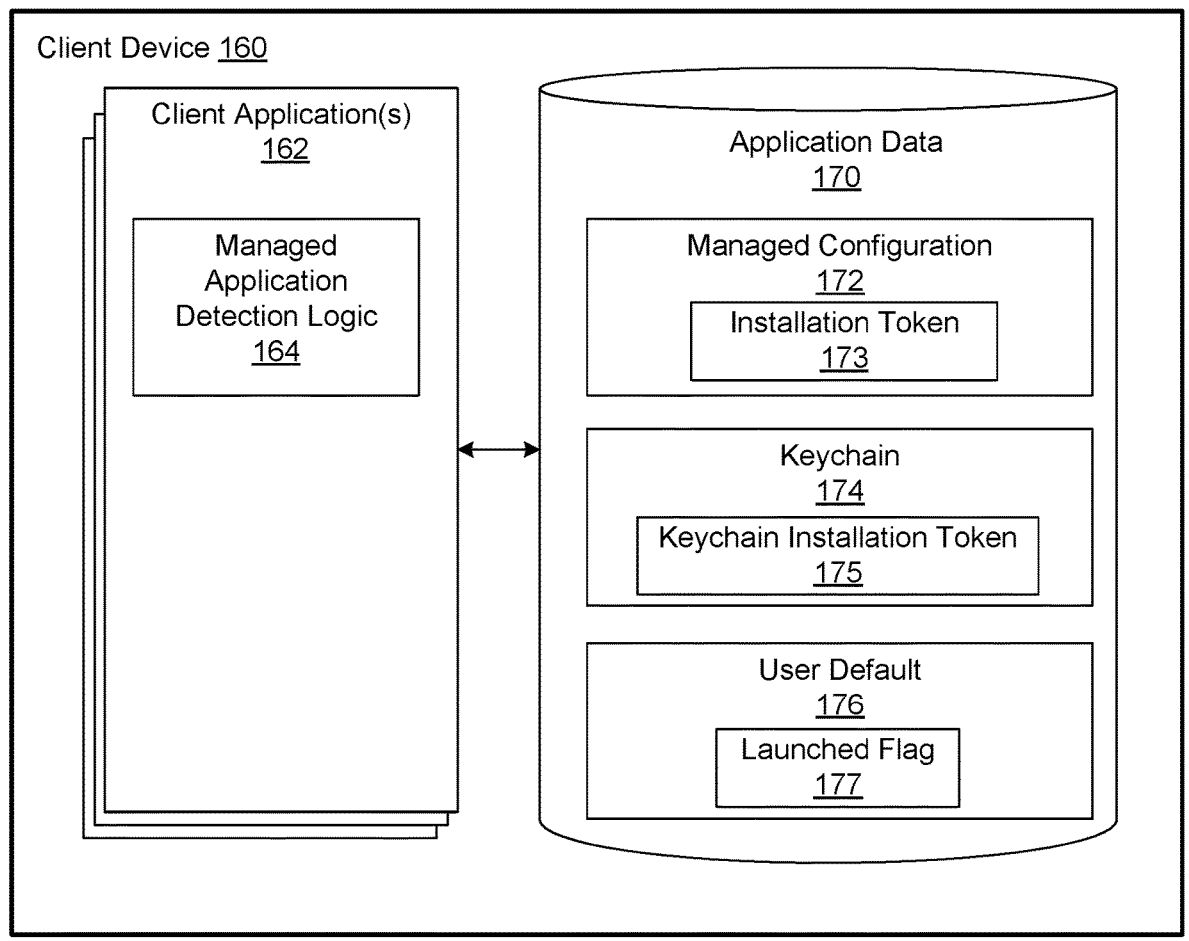
FIG. 2 illustrates the client device in the networked computing environment shown in FIG. 1 according to various examples described herein.

Turning to a more detailed description of the client application 162 and the application data 170, FIG. 2 illustrates additional aspects of the client device 160. As shown in FIG. 2, among other components, the client application 162 includes the managed application detection logic 164. Further, among other data that can be stored in the application data 170, the managed configuration data 172 includes an installation token 173, the keychain data 174 includes a keychain installation token 175, and the user default data 176 includes a launched flag 177. To help determine status of an application as managed or unmanaged, the managed application detection logic 164 can reference the installation token 173, the keychain installation token 175, and the launched flag 177.

As noted above, when installing the client application 162 to the client device 160, the managed application installer 132 can generate a unique token associated with the installation and store it in the application data 170 as the installation token 173. In that context, the managed application installer 132 can generate a unique token having any data value, so long as it is unique to the installation of the client application 162.

In turn, when the client application 162 is executed in the client device 160, the managed application detection logic 164 can copy the value of the installation token 173 into the keychain data 174 as the keychain installation token. Further, when the client application 162 is executed for the first time after being installed on the client device 160, the managed application detection logic 164 can set a value of the launched flag 177 to a logical true value. Based on the values of the installation token 173, the keychain data 174, and the launched flag 177, the managed application detection logic 164 can determine the status of the client application 162 as being either a managed or unmanaged application, even if network connectivity through the network 150 is lost.

Turning to FIG. 3, table 30 outlines various conditions that can be reviewed by the managed application detection logic 164 to determine whether the client application 162 is managed or unmanaged by the management service 130. In the table 30, six scenarios are shown, including certain values or contents of the installation token 172, the keychain installation token 175, and the launched flag 177. Additionally, for each scenario, the table 30 shows a resulting management status, either unmanaged or managed, as would be determined by the managed application detection logic 164 based on the values of the installation token 173, the keychain data 174, and the launched flag 177.

For example, to determine the management status of the client application 162, the managed application detection logic 164 can first determine whether the installation token 173 includes a unique token. Referring to the table 30, based on a determination that the installation token 173 does not include a token value (i.e., scenario 1, "None"), the managed application detection logic 164 can identify that the client application 162 is unmanaged. Because the managed application installer 132 generates a unique token when it installs a managed application on the client device 160, it follows that the client application 162 cannot be a managed application if the installation token 173 does not include a token value. This is the case regardless of the content or values of the keychain installation token 175 and the launched flag 177.

On the other hand, if the managed application detection logic 164 determines that the installation token 173 does include a unique token value, the managed application detection logic 164 can determine whether the client application 162 is managed or unmanaged based on other factors. The other factors are outlined in the table 30 and include whether the keychain installation token 175 includes a unique token value, the value of the keychain installation token 175, and a value of the launched flag 177. Each of the scenarios outlined in table 30 are described in further detail below.

Figure 4A:
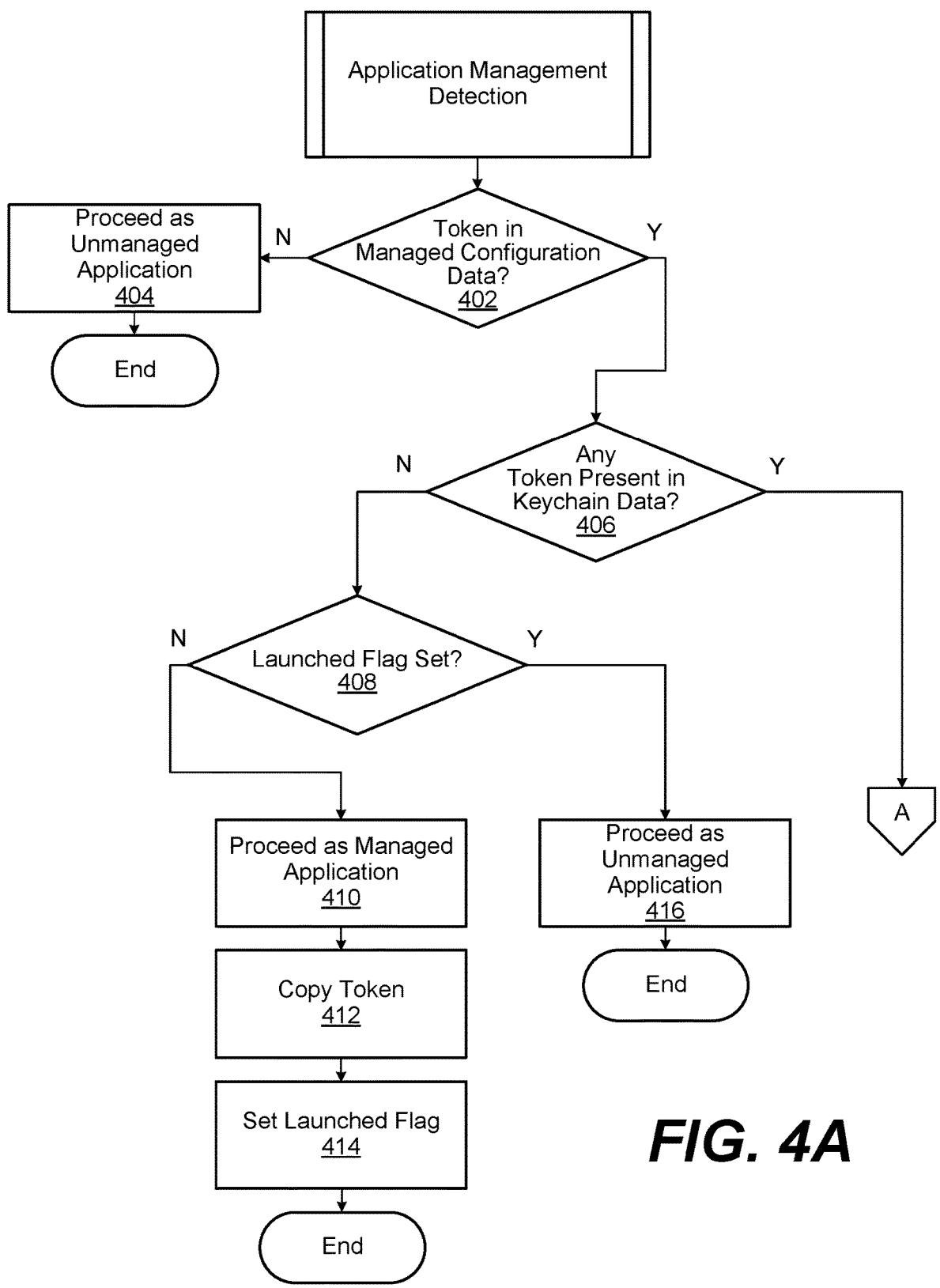
FIG. 4A illustrates a process for managed application detection according to various examples described herein.
Figure 4B:
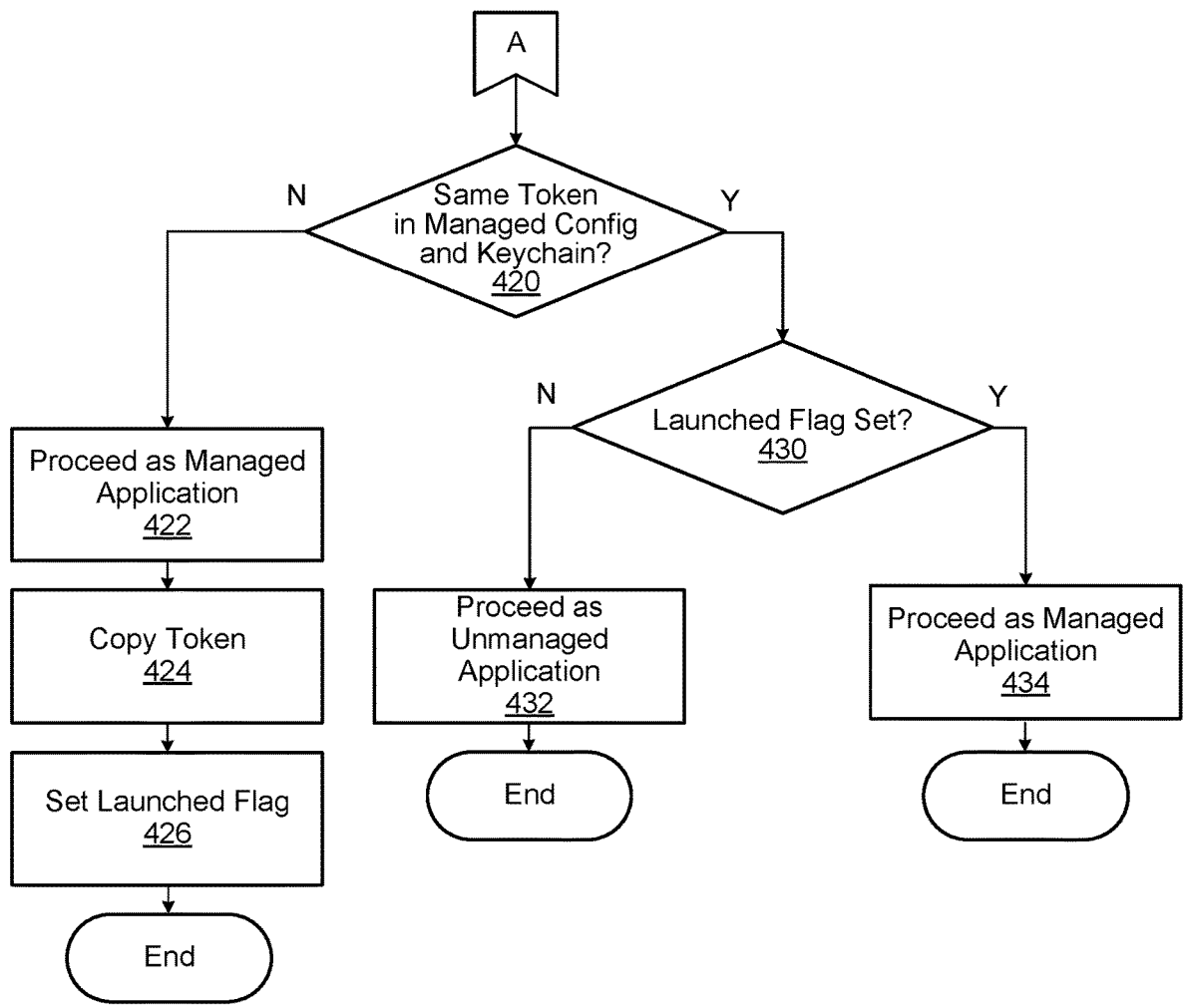
FIG. 4B further illustrates the process for managed application detection according to various examples described herein.

FIGS. 4A and 4B illustrate a process for managed application detection according to various examples described herein. The process can be performed by the client application 165 to determine whether it is a managed application, as described herein. Although the process is described below as being performed by the client device 160 as part of logic performed by the client application 162, the process can be performed by other devices and applications.

At step 402, the process includes determining whether an installation token is present in the managed configuration data 172. For example, the managed application detection logic 164 can determine whether the installation token 173 includes a unique token for the client application 162. If not, then the process proceeds to step 404. At step 404, the process includes the client application 162 proceeding as an unmanaged application. Among other actions that can be taken by the client application 162 at step 404, it may proceed to execute as an unmanaged application with limited functionality, present a notification on a user interface that it should be reinstalled by the management service 130, stop executing, or take other measures. Referring to the table 30 in FIG. 3, step 404 corresponds to the conditions presented in scenario 1, where no unique token is stored in the installation token 173.

On the other hand, if the managed application detection logic 164 determines that the installation token 173 does include a unique token value at step 402, then the process proceeds to step 406. For example, referring to table 30 shown in FIG. 3, the installation token 173 includes either "Token A" or "Token B" in scenarios 2-5. Further, scenario 6 is relevant to a case where the installation token 173 includes "Any" token, regardless of its value. Thus, for all the scenarios 2-6, the process proceeds to step 406.

At step 406, the process includes determining whether a keychain installation token is present in the keychain data 174. For example, the managed application detection logic 164 can determine whether the keychain installation token 175 includes a unique token for the client application 162. If not, then the process proceeds to step 408. If so, then the process proceeds to step 420 on FIG. 4B.

At step 408, the process includes determining whether the launched flag is set in the user default data 176 for the client application 162. That is, the managed application detection logic 164 can determine whether a value of the launched flag 177 in the user default data 176 is set to one of two logic values. The two logic values are representative of whether the client application 162 has been launched (i.e., "true") or not launched (i.e., "false") since its installation. Further, at certain points in the flow of the process, the managed application detection logic 164 can set the value of the launched flag 177 to true (e.g., steps 412 and 424). If the value of the launched flag 177 is set to false, then the process proceeds to step 410. Otherwise, if the value of the launched flag 177 is set to true, the process proceeds to step 416.

At step 410, the process includes proceeding as a managed application. Referring to FIG. 3, the conditions for this case are outlined in scenario 2 in table 30. Particularly, a token value (e.g., "Token A") was identified in the installation token 173 at step 402, no token value was identified in the keychain installation token 175 at step 406, and the value of the launched flag 177 was identified as false (e.g., "Not Launched") at step 408. Under these conditions, the managed application detection logic 164 can conclude that the client application 162 is managed by the management service 130. More particularly, due to the state of the installation token 173, the keychain installation token 175, and the launched flag 177, the managed application detection logic 164 can conclude that the client application 162 was installed by the management service 130 because the installation token 173 includes a unique token value but the keychain installation token 175 does not and the launched flag 177 is false. These conditions are consistent with the client application 162 being installed for the first time on the client device 162 and being launched for the first time. Other conditions, such as the same values in the installation token 173 and the keychain installation token 175 with the launched flag 177 being false, are consistent with the client application being unmanaged, as outlined below.

Because the client application 162 was determined at step 410 as being managed, the process proceeds to step 412. At step 412, the process includes copying the value of the installation token 173 to the keychain installation token 175. Further, at step 412, the process includes setting the launched flag 177 in the user default data 176 to true, and the process ends with the client application 162 proceeding as a managed application. In this case, the client application 162 may offer a full set of features to the user of the client device 160. Further, it is noted that the state of the installation token 173, the keychain installation token 175, and the launched flag 177 is consistent at this point with scenario 4 in table 30 in FIG. 3, as a managed application.

Referring back, if the value of the launched flag 177 is set to false at step 408, the process proceeds to step 416. At step 416, the process includes proceeding as an unmanaged application. Referring to FIG. 3, the conditions for this case are outlined in scenario 6 in table 30. Particularly, a token value (e.g., "Any") was identified in the installation token 173 at step 402, no token value was identified in the keychain installation token 175 at step 406, and the value of the launched flag 177 was identified as true (e.g., "Launched") at step 408. This state can be reached in the case that the client device 160 was restored using a backup data service over the network 150. For example, the client application 162, the managed configuration data 172, and the user default data 176 may have been restored, but the keychain installation token 175 was not. In other words, if the client application 162 was installed by the management service 130 and launched as a managed application, but later deleted and restored using a backup service, the resulting state would be the same as that shown in scenario 6 in table 30. Under these conditions, the managed application detection logic 164 can conclude that the client application 162 is unmanaged by the management service 130. In turn, the client application 162 may proceed to execute with limited functionality, present a notification on a user interface that it should be reinstalled by the management service 130, stop executing, or take other measures.

Referring back, if a keychain installation token is present in keychain data 175 at step 406, then the process proceeds to step 420 on FIG. 4B. At step 420, the process includes determining whether a value of the installation token 173 is equal to a value of the keychain installation token 175. For example, the managed application detection logic 164 can compare the value of the installation token 173 and the value of the keychain installation token 175 to determine if they are the same. If not, then the process proceeds to step 422. Otherwise, the process proceeds to step 430.

At step 422, the process includes the client application 162 proceeding as a managed application. Referring to FIG. 3, the conditions for this case are outlined in scenario 5 in table 30. Particularly, a different token value was identified in the installation token 173 than in the keychain installation token 175 at step 420. Under these conditions, the managed application detection logic 164 can conclude that the client application 162 is managed by the management service 130. These conditions are consistent with the client application 162 being reinstalled on the client device 162 and being launched for the first time. It is noted here that, because the client application 162 was reinstalled, any value of the launched flag 177 would have been cleared when the previous version of the client application 162 was deleted.

Because the client application 162 was determined at step 422 as being managed, the process proceeds to step 424. At step 424, the process includes copying the value of the installation token 173 to the keychain installation token 175 (e.g., "Token A" is overwritten by "Token B"). Further, at step 426, the process includes setting the launched flag 177 in the user default data 176 to true, and the process ends with the client application 162 proceeding as a managed application. Again, as a managed application, the client application 162 may offer a full set of features to the user of the client device 160. It is also noted that the state of the installation token 173, the keychain installation token 175, and the launched flag 177 is consistent at this point with scenario 4 in table 30 in FIG. 3, as a managed application, although both the installation token 173 and the keychain installation token 175 store the "Token B" value.

If the value of the installation token 173 and the value of the keychain installation token 175 are determined to be the same at step 420, then the process proceeds to step 430. At step 430, the process includes determining whether the launched flag is set in the user default data 176 for the client application 162. If the value of the launched flag 177 is set to false, then the process proceeds to step 432. Otherwise, if the value of the launched flag 177 is set to true, the process proceeds to step 434.

At step 432, the process includes proceeding as an unmanaged application. Referring to FIG. 3, the conditions for this case are outlined in scenario 3 in table 30. Particularly, the value of the installation token 173 was found to be equal to the value of the keychain installation token 175 at step 420, and the value of the launched flag 177 was identified as false (e.g., "Not Launched") at step 430. This state can be reached in the case that a prior installation of the client application 162 was installed as a managed application and executed at least once to copy the value of the installation token 173 to the keychain installation token 175. However, that prior installation was deleted, and the new installation of the client application 162 was installed in some way other than by the management service 130. If the new installation of the client application 162 had been installed by the management service 130 and the launched flag 177 false, the value of the installation token 173 would include a new, different token than that in the keychain installation token 175 (e.g., as in scenario 5). Under these conditions, the managed application detection logic 164 can conclude that the client application 162 is unmanaged by the management service 130. In turn, the client application 162 may proceed to execute with limited functionality, present a notification on a user interface that it should be reinstalled by the management service 130, stop executing, or take other measures.

At step 434, the process includes the client application 162 proceeding as a managed application. Referring to FIG. 3, the conditions for this case are outlined in scenario 4 in table 30. Particularly, the value of the installation token 173 was found to be equal to the value of the keychain installation token 175 at step 420, and the value of the launched flag 177 was identified as true (e.g., "Launched") at step 430. This state can be reached in the case that the client application 162 was installed as a managed application and executed at least once to set the launched flag 177 as true.

The flowcharts of FIGS. 4A and 4B show examples of the functionality and operation of implementations of components described herein. The components described herein can be implemented in hardware, software, or a combination of hardware and software. If implemented at least in part in software, each element can represent a module of code or a portion of code that includes program instructions to implement the specified logical function(s). The program instructions can be in the form of source code, for example, that includes human-readable statements written in a programming language or machine code that includes machine instructions recognizable by a suitable execution system, such as a processor in a computer system or other system. If implemented at least in part in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 160, computing environment 110, and other components described herein can include at least one processing circuit. The processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the management service 130, the client application 162, and other components can be stored in one or more storage devices and be executable by one or more processors. Also, a data store, such as the data stores 120 and 170 can be stored in the one or more memory storage devices.

The management service 130, the client application 162, the managed application detection logic 162, other components described herein can be implemented at least in part in the form of hardware, as software components that are executable by hardware, or as a combination of software and hardware. If implemented at least in part as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system, such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 110.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A system for managed application detection, comprising:
    a client device comprising at least one hardware processor;
    program instructions stored in memory and executable in the client device that, when executed by the client device, cause the client device to:
    store an installation token in a data store in response to an installation of or an update to a client application being performed on the client device, wherein the installation token is unique to the installation or the update of the client application; and
    in response to an attempted execution of the client application on the client device, determine locally on the client device between executing the client application in a managed mode of operation and an unmanaged mode of operation based at least in part on the installation token and a presence or lack of a keychain installation token stored in the data store, the unmanaged mode of operation having less functionality than the managed mode of operation.

2. The system of claim 1, wherein the installation token is generated by a mobile management service remotely located, the installation token being received by the client device from the mobile management service over a network.

3. The system of claim 2, further comprising program instructions executable in the client device that, when executed by the client device, cause the client device to download the client application from an application host service at the direction of the mobile management service.

4. The system of claim 1, further comprising program instructions executable in the client device that, when executed by the client device, cause the client device to copy the installation token from managed configuration data to keychain data as the keychain installation token in response to a first execution of the client application.

5. The system of claim 1, wherein the installation token is stored in the data store by:
    storing the installation token in managed configuration data; and
    copying the installation token in keychain data as the keychain installation token.

6. The system of claim 5, wherein the client application is executed in the managed mode of operation or the unmanaged mode of operation based at least in part on the installation token stored in the data store by:
    determining that the keychain installation token is present in the keychain data;
    determining a value of the keychain installation token; and
    determining a value of a launched flag in user default data for the client application.

7. The system of claim 6, wherein the value of the launched flag is set in response to a first execution of the client application on the client device.

8. A non-transitory computer-readable medium embodying program code for application management detection, the program code executable in a client device that, when executed by the client device, causes the client device to:
    store an installation token in a data store in response to an installation of or an update to a client application being performed on the client device, wherein the installation token is unique to the installation or the update of the client application; and
    in response to an attempted execution of the client application on the client device, determine locally on the client device between executing the client application in a managed mode of operation and an unmanaged mode of operation based at least in part on the installation token and a presence or lack of a keychain installation token stored in the data store, the unmanaged mode of operation having less functionality than the managed mode of operation.

9. The non-transitory computer-readable medium of claim 8, wherein the installation token is generated by a mobile management service remotely located, the installation token being received by the client device from the mobile management service over a network.

10. The non-transitory computer-readable medium of claim 9, further comprising program code executable in the client device that, when executed by the client device, causes the client device to download the client application from an application host service at the direction of the mobile management service.

11. The non-transitory computer-readable medium of claim 8, further comprising program code executable in the client device that, when executed by the client device, causes the client device to copy the installation token from managed configuration data to keychain data as the keychain installation token in response to a first execution of the client application.

12. The non-transitory computer-readable medium of claim 8, wherein the installation token is stored in the data store by:
    storing the installation token in managed configuration data; and
    copying the installation token in keychain data as the keychain installation token.

13. The non-transitory computer-readable medium of claim 12, wherein the client application is executed in the managed mode of operation or the unmanaged mode of operation based at least in part on the installation token by:
    determining that the keychain installation token is present in the keychain data;
    determining a value of the keychain installation token; and
    determining a value of a launched flag in user default data for the client application.

14. The non-transitory computer-readable medium of claim 13, wherein the value of the launched flag is set in response to a first execution of the client application on the client device.

15. A method for application management detection, comprising:
 storing an installation token in a data store of a client device in response to an installation of or an update to a client application being performed on the client device, wherein the installation token is unique to the installation or the update of the client application; and
 in response to an attempted execution of the client application on the client device, determining locally on the client device between executing the client application in a managed mode of operation and an unmanaged mode of operation based at least in part on the installation token and a presence or lack of a keychain installation token stored in the data store, the unmanaged mode of operation having less functionality than the managed mode of operation.

16. The method of claim 15, wherein the installation token is generated by a mobile management service remotely located, the installation token being received by the client device from the mobile management service over a network.

17. The method of claim 16, further comprising downloading the client application from an application host service at the direction of the mobile management service.

18. The method of claim 15, further comprising copying the installation token from managed configuration data to keychain data as the keychain installation token in response to a first execution of the client application.

19. The method of claim 15, wherein storing the installation token in the data store comprises:
 storing the installation token in managed configuration data; and
 copying the installation token in keychain data as the keychain installation token.

20. The method of claim 19, wherein:
 executing the client application in the managed mode of operation or the unmanaged mode of operation based at least in part on the installation token stored in the data store comprises:
  determining that the keychain installation token is present in the keychain data;
  determining a value of the keychain installation token; and
  determining a value of a launched flag in user default data for the client application; and
 the value of the launched flag is set in response to a first execution of the client application on the client device.

* * * * *